(12) United States Patent
Koltay et al.

(10) Patent No.: US 11,130,461 B2
(45) Date of Patent: Sep. 28, 2021

(54) COLLISION ACTIVATED RADIO-FREQUENCY IDENTIFICATION RECORDER

(71) Applicant: Hidden Angel LLC, St. Petersburg, FL (US)

(72) Inventors: Patrick Koltay, St. Petersburg, FL (US); Steven Britt, St. Petersburg, FL (US)

(*) Notice: Subject to any disclaimer, the term of this patent is extended or adjusted under 35 U.S.C. 154(b) by 126 days.

(21) Appl. No.: 16/690,336

(22) Filed: Nov. 21, 2019

(65) Prior Publication Data

US 2021/0155184 A1 May 27, 2021

(51) Int. Cl.
| | |
|---|---|
| *G06K 5/00* | (2006.01) |
| *B60R 21/0134* | (2006.01) |
| *G06K 19/077* | (2006.01) |
| *G06K 19/06* | (2006.01) |
| *B60R 21/01* | (2006.01) |

(52) U.S. Cl.
CPC .... *B60R 21/0134* (2013.01); *G06K 19/06196* (2013.01); *G06K 19/07773* (2013.01); *B60R 2021/01013* (2013.01)

(58) Field of Classification Search
CPC .. G06K 9/26; G06K 9/00832; G06K 7/10732; G60R 25/25; G60R 25/257; H01S 5/4025; H01S 5/02325
USPC ................................. 235/380, 383; 280/735
See application file for complete search history.

(56) References Cited

U.S. PATENT DOCUMENTS

| | | | | |
|---|---|---|---|---|
| 8,047,432 | B2* | 11/2011 | Breed | B60R 21/01534 235/384 |
| 8,066,192 | B2* | 11/2011 | Maus | G06K 19/0719 235/492 |
| 8,581,747 | B2* | 11/2013 | Shirakawa | G06Q 30/0267 340/944 |
| 8,626,193 | B1* | 1/2014 | Crossno | G06Q 10/0833 455/456.1 |
| 8,810,392 | B1* | 8/2014 | Teller | G08B 21/24 340/539.32 |
| 8,886,215 | B1* | 11/2014 | Crossno | G06Q 30/0241 455/456.1 |
| 9,102,220 | B2* | 8/2015 | Breed | B60R 21/01516 |

(Continued)

*Primary Examiner* — Daniel St Cyr
(74) *Attorney, Agent, or Firm* — Tiffany C. Miller; Inventions International Inc.

(57) ABSTRACT

A collision activated RFID recorder for a vehicle having an RFID reader/recorder, the RFID reader/recorder has a transceiver. A transceiver has a receiver capable of receiving signals and a transmitter capable of sending signals. A collision activated RFID reader/recorder is in electrical communication with memory. Imported data may be stored in the memory of the activated RFID reader/recorder. The collision activated RFID reader/recorder has a collision sensor configured to be mounted on a vehicle. The collision sensor has an antenna configured to transmit an activation signal to the transceiver of the RFID reader/recorder, whereby, said collision sensor detects a collision, generates said activation signal, and then transmits the activation signal to the transceiver of said radio-frequency identification recorder. The RFID reader/recorder is configured to be activated when the transceiver of the RFID reader/recorder receives the activation signal from the collision sensor.

2 Claims, 3 Drawing Sheets

(56) References Cited

U.S. PATENT DOCUMENTS

| | | | |
|---|---|---|---|
| 2007/0075919 A1* | 4/2007 | Breed | ................... B60R 21/013 345/8 |
| 2008/0147280 A1* | 6/2008 | Breed | ..................... B60R 21/33 701/46 |
| 2008/0276191 A1* | 11/2008 | Breed | ................... B60N 2/002 715/771 |

* cited by examiner

COLLISION ACTIVATED RADIO-FREQUENCY IDENTIFICATION RECORDER

BACKGROUND OF THE INVENTION

1. Field of the Invention

This invention relates, generally, to a collision activated radio-frequency identification (RFID) reader/recorder for a vehicle. More particularly, it relates to a data reader/recorder having a collision sensor capable of activating the collection and storage of unique identifying information from an RFID tag containing electronically stored information of a person, a vehicle, or any surveillance equipment capable of emitting a unique identifier, within a proximity from a detected impact within a collision zone.

2. Background Art

Accidents involving personal injury or property damage often require witness testimony to determine fault of an accident. It would be desirable for any person, vehicle or surveillance equipment including, but not limited to, video recorders or cameras having RFID chips within proximity of the accident to be available to law enforcement during investigation proceedings. This availability would provide law enforcement the opportunity to extract identifying data from the RFID chip memory to gather witness testimony and/or evidence. Thus, there is a need for a collision activated RFID reader/recorder for a vehicle that is configured to collect identifying information from surrounding persons of interest, vehicles, or surveillance equipment, at the time an accident is detected by the system. As a result, during the investigation of an accident, a law enforcement agent may extract stored identifying information within the memory of the RFID reader/recorder and proceed with a more efficient and thorough investigation.

Hit-and-run is a term describing the act of causing a traffic accident and not stopping afterwards or fleeing from the scene of an accident quickly. Often times the victim that is struck by a vehicle is seriously injured and the impact of the hit may be fatal or may result in costly property damage. Yet, the driver of the vehicle causing the traffic accident may successfully flee the scene of the traffic accident without being caught and without being brought to justice. Thus, there is a need for the identifying information of any potential witnesses within a proximity from the location of the accident to be collected and stored within the memory of a RFID reader/recorder. As a result, an authorized user such as a police officer or other law enforcement agencies that are investigating an accident may retrieve potential witness information from the RFID reader/recorder memory.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a novel collision activated RFID recorder for a vehicle having an RFID reader/recorder, the RFID reader/recorder has a transceiver. A transceiver has a receiver capable of receiving signals and a transmitter capable of sending signals. A collision activated RFID reader/recorder is in electrical communication with memory. Imported data may be stored in the memory of the activated RFID reader/recorder. The collision activated RFID reader/recorder has a collision sensor configured to be mounted on a vehicle. The collision sensor has an antenna configured to transmit an activation signal to the transceiver of the RFID reader/recorder, whereby, said collision sensor detects a collision, generates said activation signal, and then transmits the activation signal to the transceiver of said radio-frequency identification recorder. The RFID reader/recorder is configured to be activated when the transceiver of the RFID reader/recorder receives the activation signal from the collision sensor which also includes improvements that overcome the limitations of prior art RFID recorders is now met by a new, useful, and non-obvious invention.

The RFID reader/recorder is configured to generate an electromagnetic pulse and transmit the electromagnetic pulse to a RFID tag when the activation signal is received by the transceiver of the RFID reader/recorder. The RFID tag has identifying data of a person, vehicle, or surveillance equipment configured to be stored within the memory of the RFID reader/recorder.

The collision activated RFID reader/recorder is in electrical communication with a power source. The power source includes, but is not limited to, a battery, alternating current (AC), direct current (DC), or solar energy.

The collision activated RFID reader/recorder may be connected to a removable electronic device. The electronic device is in electrical communication with the memory of said RFID reader/recorder. The electronic device is configured to gain access to the data retained within the memory of an RFID reader/recorder when authentication is validated.

The collision activated RFID recorder may be installed on a vehicle including, but not limited to, a bicycle, a trailer, a motorcycle, a wheelchair, or a motor vehicle. It is within the scope of this invention for all modes of transportation to be capable of having the novel collision activated RFID reader/recorder mounted thereto. This vehicle-mounted collision activated RFID reader/recorder has a collision sensor capable of activating a RFID reader/recorder. It is within the scope of this invention for the collision sensor to be any sensing device capable of sensing an impact including, but not limited to, an accelerometer or a crash-zone sensor. For example, a front dual-axis acceleration sensor with Y-axis sensing is configured to sense the impact and lateral deformation of a vehicle. Many of these sensors sense the deceleration taking placing during a vehicle crash or an accident. Additionally, GPS sensors may determine the position and provide tracking information of the vehicle with respect to the road during an accident. In another example, during a roll over, if the vehicle moves out of the horizontal plane, the collision sensor may be activated.

The collision sensor determines a collision or an impact associated with the force of the vehicle in which the collision activated RFID recorder is mounted to and a foreign object such as personal property, an animal, a pedestrian, or a person. The collision sensor then sends an impulse signal to the RFID reader/recorder which activates the RFID recorder. RFID uses electromagnetic fields to automatically identify and track tags attached to objects. The tags contain electronically stored information. Activation of the RFID reader/recorder initiates data collection and storage of unique identifying information from RFID tags and chips from including, but not limited to, passports, credit cards, or driver licenses within a proximity of the detected collision zone. This unique identifying information collected is linked to a person or vehicle and may identify potential witnesses within the collision zone. The collision zone is a location having a proximity of the detected collision. It is within the scope of this invention for a proximity to be a distance having a range of including, but not limited to, at least 65 yards between the RFID reader/recorder and the RFID tag of a potential witness, vehicle, or surveillance equipment.

A signal is generated by the collision sensor when a collision is detected. This signal is transmitted to the RFID reader/recorder and activates the RFID reader/recorder. When the RFID reader/recorder is activated, the RFID reader/recorder generates a signal including, but is not limited to, an electromagnetic pulse. This electromagnetic pulse is power that is transmitted from the antenna of the RFID reader/recorder to a receiver of an RFID tag within the collision zone to energize a RFID tag. This energized RFID tag will then transmit back the RFID tags unique identifying data including, but not limited to, a person's name, identity, address, phone number, in any frequency band including, but not limited to, the ultra-high frequency (UHF) band. The identifying data collected from at least one RFID tag or a plurality of RFID tags within the collision zone is then stored in a memory of the collision activated RFID reader/recorder. The RFID reader/recorder also records the time and date in the memory so that users have a record of where and when that object was identified.

In an example, a witness having a RFID chip embedded driver license located within a proximity of a collision zone, the radio-frequency (RF) field emitted from the antenna of the RFID reader/recorder energizes the RFID chip embedded within the witness's driver license. The RFID chip of the potential witness driver license broadcasts a signal back to the RFID reader/recorder of the collision activated radio-frequency identification recorder with some unique identifying information such as the potential witness's name and phone number. That information is transferred from the RFID reader/recorder to a memory. This information within the memory may be retrieved after successful authentication criteria have been met by a user.

Stored RFID data within the memory of the RFID reader/recorder may be accessed through any data collection process including, but not limited to, Universal Serial Bus (USB), OnStar, a cell phone, Wi-Fi, or Bluetooth upon completing a user authentication process. An electronic device may have a touch screen or a screen having a graphic user interface (GUI) capable of receiving an authentication code from a user and allowing access to the data retained in the memory of the RFID reader/recorder. The electronic device such as a computer, a tablet, or a smart phone is in electrical communication with the RFID reader/recorder. For example, this electrical communication may be wired with a cable plugged into a USB port of the RFID reader/recorder or by wireless communication. The stored RFID data may be protected by a lock and key authentication method. An authorized user including, but not limited to, the police or other law enforcement agencies that are investigating an accident would have a key. The key may be a code or a mechanical key. In an example, if a police officer inputs the correct code into the GUI of the electronic device that is in electrical communication with the RFID reader/recorder, than authentication will be successful. A successful match in passcodes will allow the user to gain access to the RFID data within the memory.

It is within the scope of this invention for the collision activated RFID reader/recorder for a vehicle to have a heat module, a plurality of antenna ports, a power board, a crash sensor, an RFID reader, auxiliary power, at least one antenna, a USB port, and connectivity for a plurality of electronic devices to electrically communicate with.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
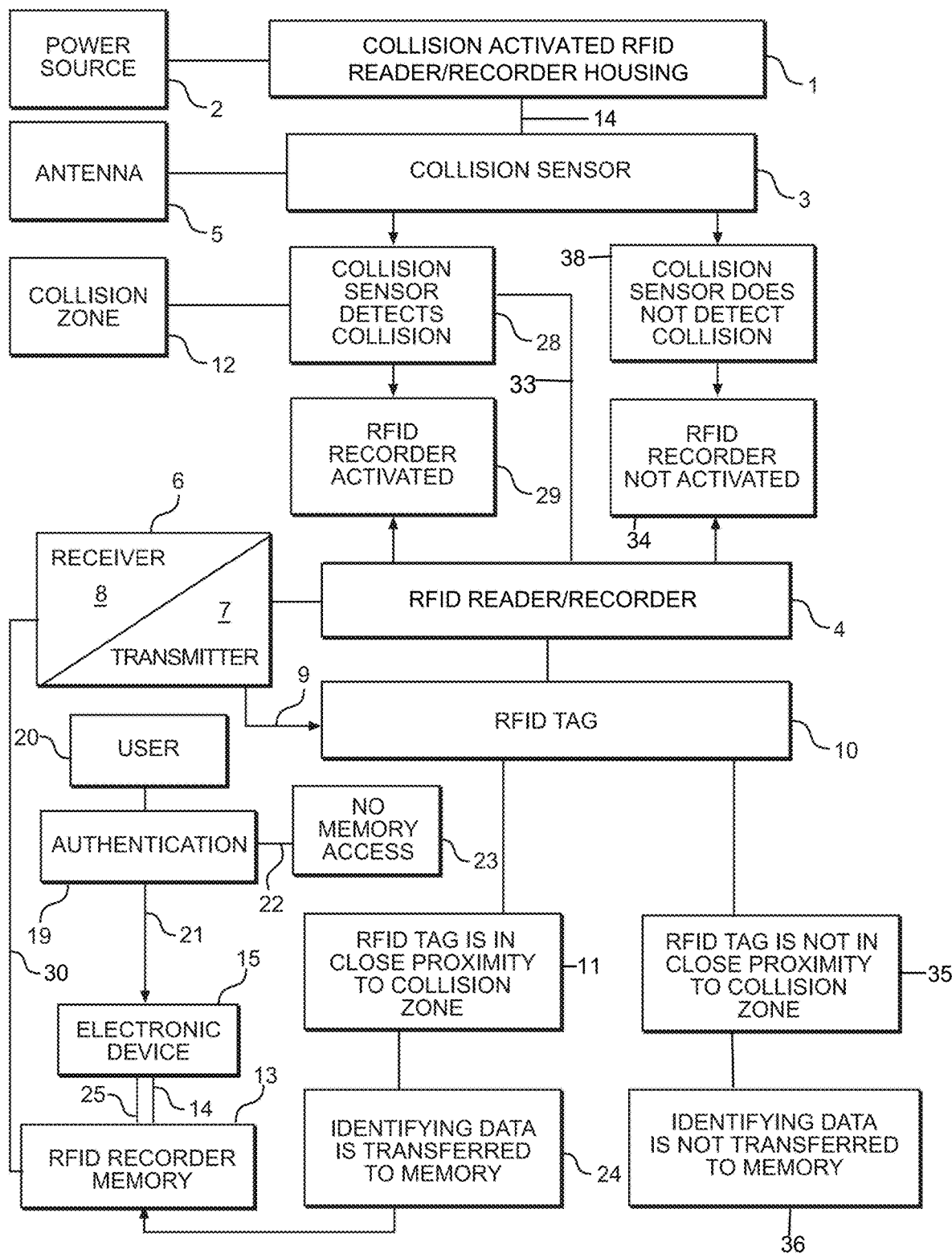
FIG. 1 is a flow chart of the novel collision activated radio-frequency identification (RFID) reader/recorder system for a vehicle.

FIG. 1 illustrates a preferred embodiment of collision activated RFID reader/recorder housing 1 having power source 2 is in electrical communication 14 with collision sensor 3. Collision sensor 3 has antenna 5 and determines if a collision occurs. A collision may be any impact associated with the force of a vehicle in which the collision activated RFID reader/recorder housing 1 is mounted to and a foreign object such as personal property, an animal, a pedestrian, or a person. If collision sensor 3 detects a collision 28 within collision zone 12, than RFID reader/recorder 4 is activated 29. In particular, collision sensor 3 sends impulse signal 33 to RFID reader/recorder 4 which activates RFID reader/recorder 29. Alternatively, when collision sensor 3 does not detect a collision 38, RFID recorder 4 is not activated 34.

FIG. 1 further depicts that when RFID reader/recorder 4 is activated 29, RFID reader/recorder 4 generates signal 9 (FIGS. 1 and 2) including, but is not limited to, electromagnetic pulse 9. Electromagnetic pulse 9 is power that is transmitted from the transmitter 7 of transceiver 6 or antenna of RFID reader/recorder 4 to a receiver of RFID tag 10 within collision zone 12 to energize RFID tag 10. Energized RFID tag 10 will then transmit back the RFID tags unique identifying data 24 (FIGS. 1-3) to receiver 8 of RFID reader/recorder 4. It is within the scope of this invention for unique identifying data 24 to include, but not be limited to, a person's name, identity, address, phone number, in any frequency band including, but not limited to, the ultra-high frequency (UHF) band. In particular, if RFID tag 10 is located within close proximity 11 to collision zone 12, than identifying data 24 is transferred to memory 13 of RFID reader/recorder 4. Identifying data 24 collected from at least one RFID tag 10 or a plurality of RFID tags (not shown) within collision zone 12 is then stored in memory 13 of collision activated RFID reader/recorder 4. Further, if RFID tag 10 is not located within close proximity 35 to collision zone 12, than identifying data 24 is not transferred to memory 36 of RFID reader/recorder 4.

FIG. 1 depicts RFID reader/recorder 4 is in electrical communication 30 with memory 13. Identifying data 24 retained within memory 13 may be retrieved after successful 21 authentication 19 criteria have been met by user 20. In particular, stored RFID data 24 within memory 13 of RFID reader/recorder 4 may be accessed through any data collection process including, but not limited to, Universal Serial Bus (USB) 37 (FIG. 2), OnStar, electronic device 15, Wi-Fi, or Bluetooth upon completing a user authentication process. In an example, if user 20 fails 22 the authentication process such as inputting incorrect password, than user 20 will not 23 have access to memory 13. Thus, user 20 will not be able to have access to identifying information 24 from RFID tag 10. In another example, electrical connection 14 exists between electronic device 15 and RFID recorder memory 13. If user 20 succeeds at passing 21 authentication process 19 such as inputting incorrect password, than user 20 will have access 25 to memory 13. Thus, user 20 will be able to have access 25 to identifying information 24 from RFID tag 10.

Figure 2:
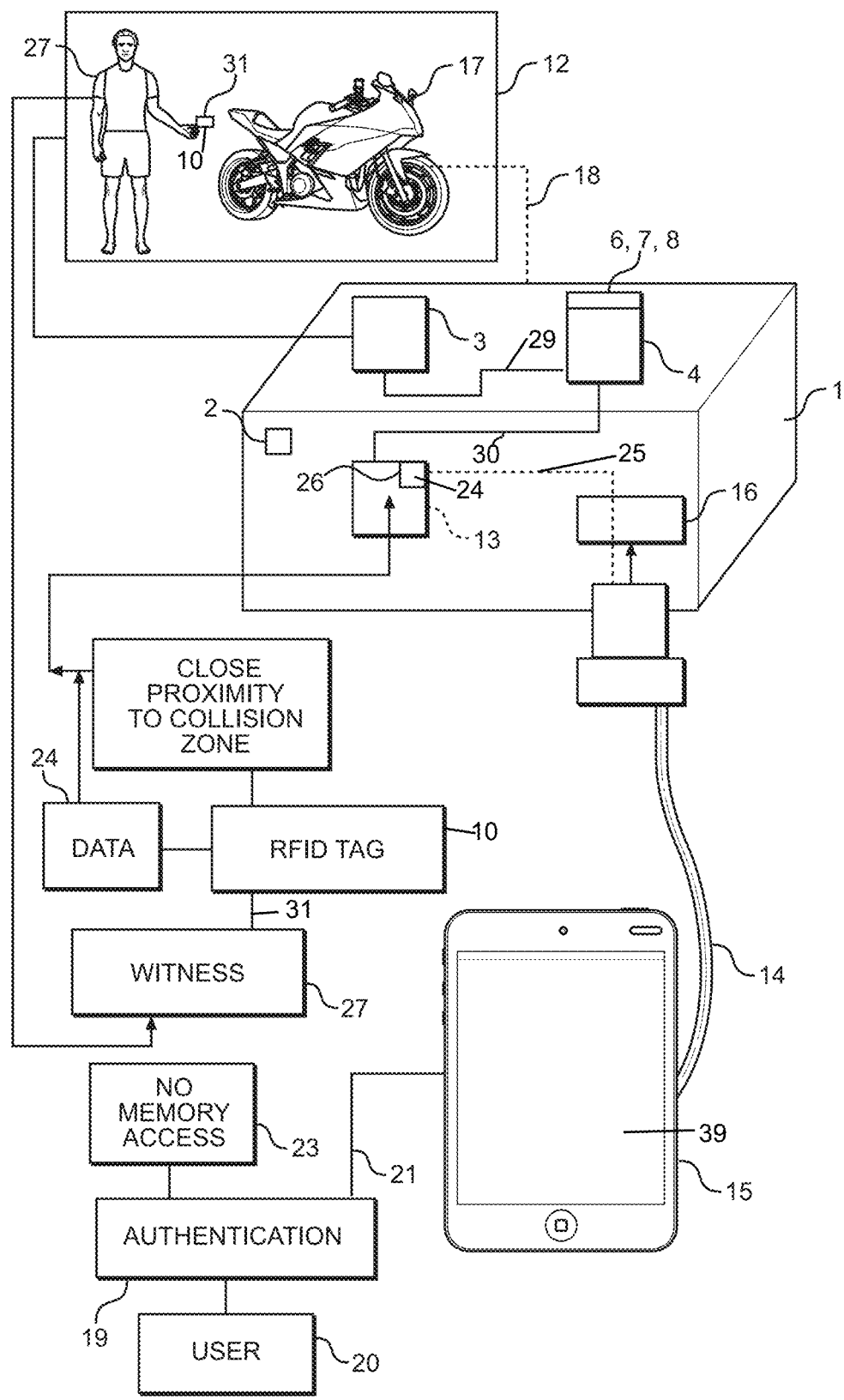
FIG. 2 is a flow chart of the novel collision activated radio-frequency identification (RFID) reader/recorder system for a vehicle; and, FIG. 3 is a perspective view of the novel collision activated radio-frequency identification (RFID) reader/recorder system for a vehicle in electrical communication with an electronic device and with an RFID tag on an object.

FIG. 2 illustrates collision activated RFID recorder housing 1 having power source 2 and USB port 16 receiving USB 37. Electrical cord 14 has an end having a USB 37 located opposite another end connected to electronic device 15. USB 37 is received by USB port 16. Electronic device 15 may have touch screen 39 or a screen having a graphic user interface (GUI) capable of receiving an authentication code 19 from user 20. If user 20 successfully 21 enters a correct passcode of authentication system 19, user 20 is allowed access 25 to identifying data 24 stored 26 within memory 13 of RDIF reader/recorder 4. RFID reader/recorder 4 is in electrical communication 30 with memory 13. RFID reader recorder has transceiver 6. Transceiver 3 has both transmitter 7 and receiver 8. RDIF reader/recorder is activated 29 when collision sensor 3 detects a collision within collision zone 12.

Figure 3:
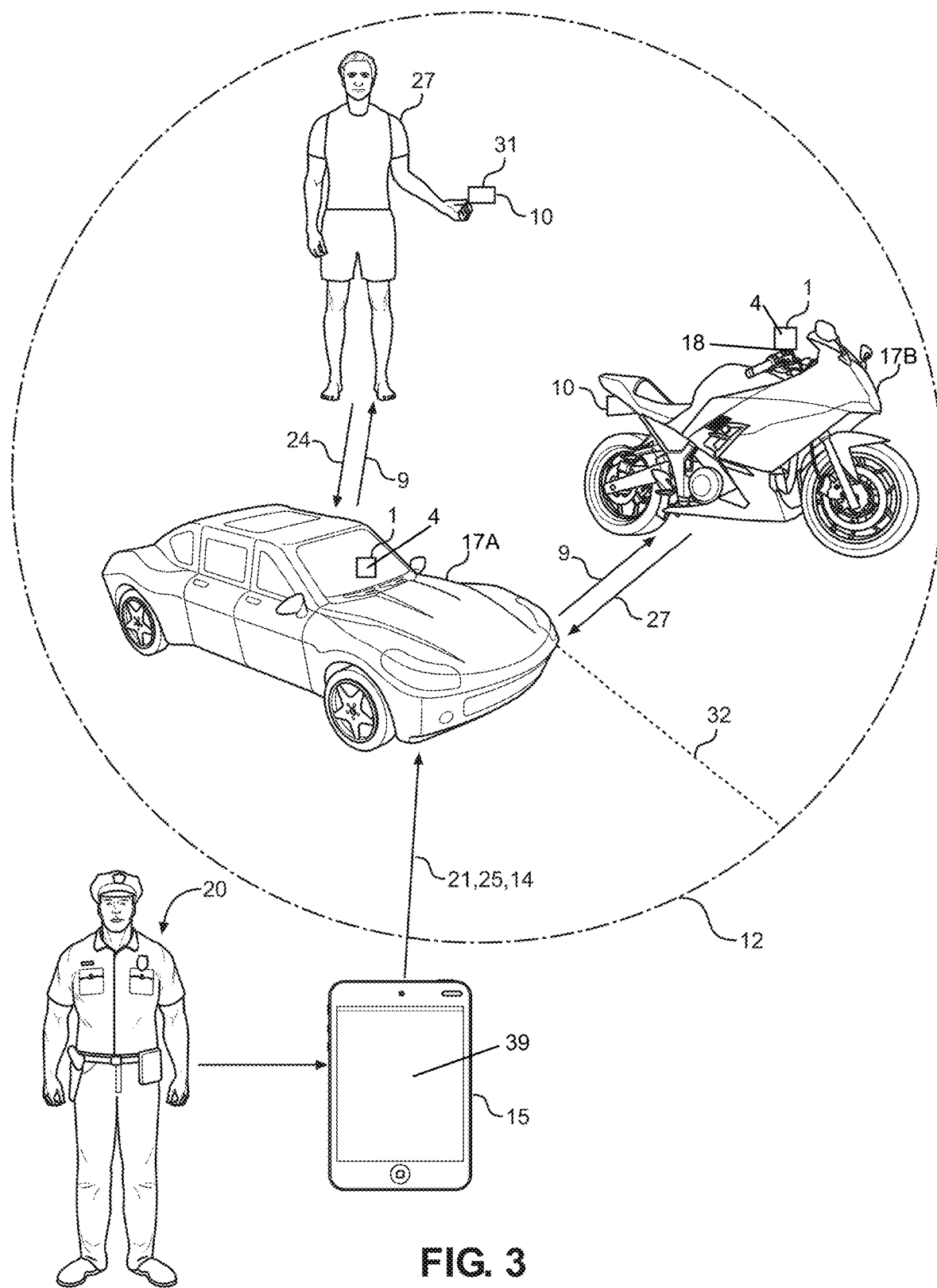

In particular, FIGS. 2 and 3 show collision zone 12 being an area in which vehicle 17 is a motorcycle and is connected to collision activated RFID recorder housing 1. Housing 1 is mounted 18 onto motorcycle 2 in this example. Witness 27 is located within collision zone 12. Witness 27 has object 31 with RFID tag 10 connected to object 31. Object 31 in this illustration, is card 31, however, it is within the scope of this invention for object 31 to be anything with an RFID tag connected thereto including, but not limited to, a vehicle 17 (FIG. 3), a passport, an identification card, or a credit card. RFID tag 10 has data 24 (FIG. 2) such as including, but not limited to, the name, address, or phone number of witness 27. If RFID tag 10 is in close proximity 11 to or within a predetermined distance 32 (FIG. 3) from collision zone 12, then data 24 (FIG. 2) is transferred to memory 13 (FIG. 2) of RFID reader/recorder 4 where it is stored 26 (FIG. 2).

FIGS. 2 and 3 depict electronic device 15 having touch screen 39. Electronic device 15 can include, but not be limited to, a computer, a tablet, or a smart phone that is in electrical communication 14 with RFID reader/recorder 4 (FIGS. 1 and 2) retained within collision RFID reader/recorder housing 1. For example, electrical communication 14 may be wired with a cable 14 (FIG. 2) plugged into USB port 16 (FIG. 2) of RFID reader/recorder housing 1 or by wireless communication. The stored 26 RFID data 24 may be protected by a lock and key authentication method 19. An authorized user 20 including, but not limited to, the police or other law enforcement agencies that are investigating an accident would have a key. The key may be a code or a mechanical key. In an example, if a police officer inputs the correct code into the GUI of electronic device 15 that is in electrical communication 14 with the RFID reader/recorder 4, then authentication will be successful 21. A successful match in passcodes will allow the user to gain access 25 to RFID data 24 within memory 13. Alternatively, if user 20 does not input the correct authentication credentials, access to memory 13 and data 24 will be prohibited 23 (FIGS. 1 and 2).

FIG. 3 illustrates witness 27 having object 31 with RFID tag 10 is within collision zone 12 of vehicle 17A being a car. When the RFID reader/recorder 4 within housing 1 detects an impact, identifying information retained within RFID tag 10 of witness 27 will be collected and stored within RFID reader/recorder 4 of car 17A. Additionally, motorcycle 17B has RFID tag 10 connected thereto and the vehicular information including the registration data of the vehicle of RFID tag 10 is transferred and stored within RFID reader/recorder 4 of car 17A. As a result, because the owner of motorcycle 17B was within close proximity 11 to car 17A during the detected impact, motorcycle 17B may be considered a possible witness observing the collision, a victim involved in the collision, or a culprit causing the collision. User 20 being a police officer would find it desirable to be able to question owner of motorcycle 17B to gain more information about the collision.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

The invention claimed is:

1. A collision activated radio-frequency identification recorder, comprising:
    a housing configured to be mounted on a vehicle, said housing comprising: a radio-frequency identification recorder, said radio-frequency identification recorder having a transceiver, said radio-frequency identification recorder is in electrical communication with memory;
    a collision sensor, said collision sensor having an antenna configured to transmit an activation signal to said transceiver of said radio-frequency identification recorder, whereby, said radio-frequency identification recorder is activated when said collision sensor detects a collision, generates said activation signal, and then transmits said activation signal to said transceiver of said radio-frequency identification recorder;
    said radio-frequency identification recorder is configured to generate an electromagnetic pulse and transmit said electromagnetic pulse to a radio-frequency identification tag of an object located within a collision zone having a predetermined distance when said activation signal is received by said transceiver of said radio-frequency identification recorder, whereby, said radio-frequency identification tag of said object having identifying data, said identifying data is configured to be stored within said memory of said radio-frequency identification recorder; and,
    a power source, said radio-frequency identification recorder is in electrical communication with said power source.

2. The collision activated radio-frequency identification recorder of claim 1, further
comprising an electronic device, said electronic device is in electrical communication with said memory of said radio-frequency identification recorder, said electronic device gains access to said data retained within said memory when authentication credentials are validated.

\* \* \* \* \*